Figure 1:
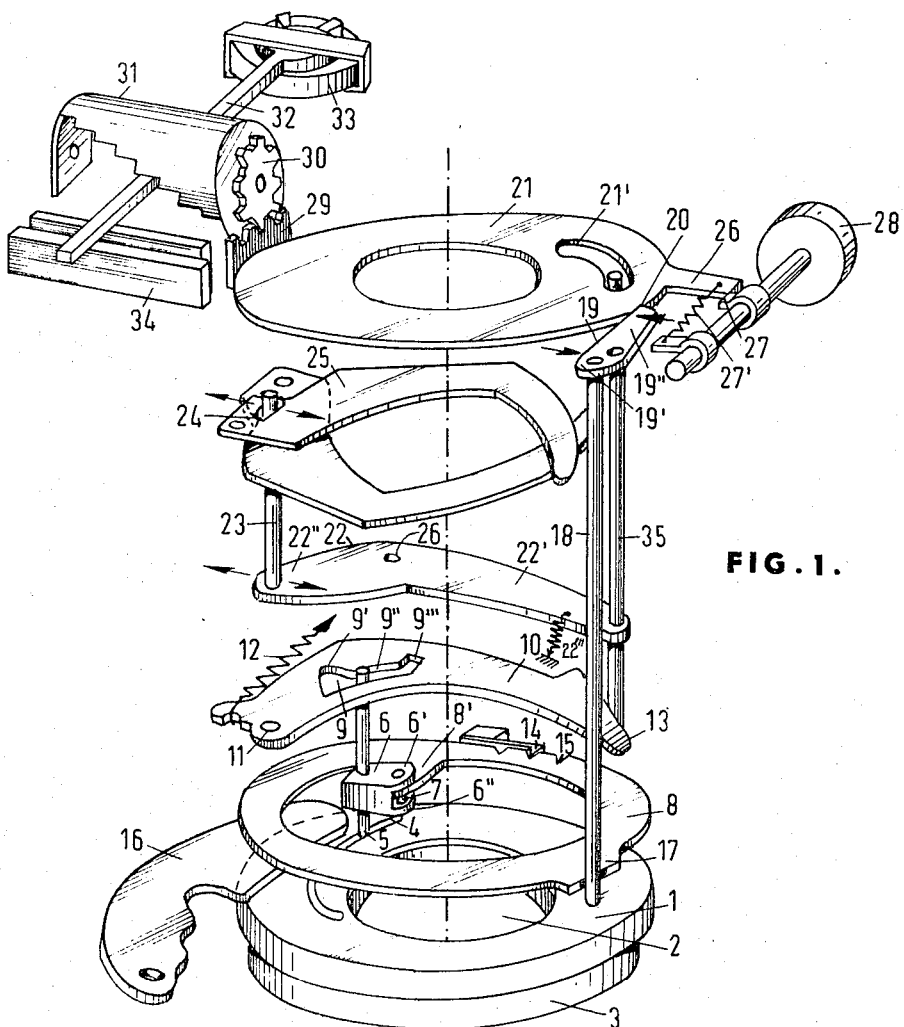

Dec. 19, 1967  K. H. LANGE  3,358,571
PHOTOGRAPHIC CAMERAS WITH AUTOMATIC AND
FLASHLIGHT EXPOSURE CONTROL
Filed March 24, 1965

INVENTOR:
Karl Heinz Lange
BY
Sparrow and Sparrow
ATTORNEYS

United States Patent Office 3,358,571
Patented Dec. 19, 1967

3,358,571
PHOTOGRAPHIC CAMERAS WITH AUTOMATIC AND FLASHLIGHT EXPOSURE CONTROL
Karl Heinz Lange, Bunde-Ennigloh, Westphalia, Germany, assignor to Balda-Kamerawerk Rudolf Gruter, Kommanditgesellschaft, Bunde, Westphalia, Germany, a company of Germany
Filed Mar. 24, 1965, Ser. No. 445,840
Claims priority, application Germany, June 2, 1964, B 77,028
8 Claims. (Cl. 95—10)

This invention relates to a photographic camera with automatic exposure control.

Cameras with automatic exposure control have recently been developed to simplify and facilitate the taking of photographs, and in such cameras the aperture or diaphragm is automatically always so adjusted in dependence on the light measured by an exposure meter that optimum exposures are obtained.

This automatic exposure mechanism is in the first instance of use only for daylight exposures. However, most cameras are arranged and can be used for direct flashlight exposures, and for such exposures it is also desirable for the aperture to be adjusted in dependence on the distance, since of course flashlight illumination decreases with increasing distance from the subject. There is also "bounce" flashlight exposure, in which the flashlight reflector is not aimed forward at the subject, but laterally or towards the ceiling, so that only indirect light can illuminate the subject. In such cases the average of the distance relationship is taken but it is much different from direct flashlight exposures.

The object of the invention is to provide means whereby in cameras having automatic exposure control the aperture is adjusted differently, but always automatically depending upon the required purpose, i.e., daylight, direct or bounced flash.

The present invention provides a photographic camera including a changeover ring, a focussing ring and a control lever for adjusting the camera aperture, the changeover ring carrying a transmission pin which engages a first cam in the focussing ring and a second cam in the control lever, the second cam being divided into first, second and third zones and the changeover ring being movable to a first position for daylight photography, a second position for direct flashlight photography and a third position for bounced flashlight photography where the transmission pin lies within a respective zone of the second cam, the first zone being so shaped as to accommodate free movement of the transmission pin and thereby allow adjusting of the aperture independently of the focussing ring and the second and third zones being so shaped as to transmit movement of the pin to the control lever and thereby adjust the aperture in dependence on adjustment of the focussing ring. This obviates the need for any thought or adjustment on the part of the user to control the aperture. He only has to focus the required subject.

Further details of the invention will be explained in detail with reference to the drawings, which illustrate one embodiment of the invention.

Figure 2:
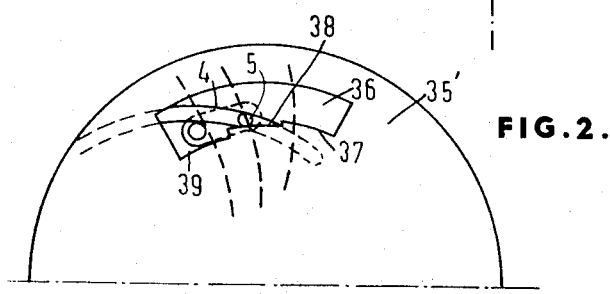

FIGURE 1 is an exploded view of a combined aperture adjustment system of a photographic camera according to the invention; and FIGURE 2 is a plan view of a limiting plate for distance settings.

In FIGURE 1 a focussing ring 1 carries an objective 2. The ring is provided with knurling 3 to permit convenient adjustment.

At its end face adjacent to the camera body the focussing ring 1 has a cam groove 4 engaged by a transmission pin 5 mounted at the free end of a rocking lever 6 which, as will be apparent from FIGURE 1, is in the form of a box or is bent from sheet metal and is borne by its arms 6', 6" on a rigid double pivot 7 of a projection 8' on a changeover ring 8. The rocking lever 6 is thus rockable about the pivot 7.

That end of the transmission pin 5 which is remote from the cam groove 4 engages another cam 9 consisting of three zones 9', 9", 9'''. This latter cam is situated in a control lever 10 rockable about a pivot 11 and subject to the action of a return spring 12. At its free end is another guide cam 13 in constant engagement with a guide pin 35.

The changeover ring 8 has three click-stop positions which are located by a lever 14 and notches 15, these positions corresponding to the various exposure conditions, i.e., daylight exposures, direct and bounced flashlight exposures. In each of these positions, the transmission pin 5 engages the respective zone 9', 9" or 9''' of the cam 9. Shutter blades 16 are situated between the focussing ring 1 and the changeover ring 8.

The changeover ring 8 is also provided with a control lug 17 adapted to engage a control bar 18 when the changeover ring is in either of the positions for flashlight photography. The bar 18 then acts on an arm 19' of a rocking lever 19 so that the other arm 19" of which engages in a recess 20 in a control ring 21 thus locking the control ring 21 so that it cannot rotate.

The guide pin 35 is borne by an end 22' of a rocking lever 22 the other end 22" of which is connected to a guide bar 23 engaging in slots 24 of diaphragm blades 25. The arm 22 is pivotable about a pivot 26. The aperture between diaphragm blades 25 can therefore be adjusted by pivoting of the lever 22. A spring 22''' fastened between housing and arm 22 effects the constant engagement between pin 35 and cam 13.

The control ring 21 has a cam 21' engaged by the guide pin 35 and a projection 26 abutting a stop 27 on a shutter release 28 to drive the ring 21 via a spring 27' when the shutter release 28 is depressed and the arm 19" is not engaged in the recess 20.

Depression of the shutter release 28 rotates the control ring 21 and crown teeth 29 meshing with a gearwheel 30 of a stepped cylinder 31. The amount of rotation of is determined by the position of the pointer 32 of a built-in exposure meter 33. To relieve the pointer 32 and its bearing system from load as much as possible and ensure a distinct stop, a stop strip 34 or, if required, two such strips are provided, against which the pointer 32 can bear snugly. The stepped cylinder 31 moves in the gap between two strips 34.

The arrangement operates as follows:

If the focussing ring 1 and hence the objective 2 are so adjusted for a specific exposure, for example a daylight exposure, as to give a sharply focussed image, the transmission pin 5—which for daylight exposures moves in the widened portion 9' of the cam 9—is driven by the cam groove 4 but remains inoperative. The portion 9' is so wide that the transmission pin 5 can move freely within it and therefore the focussing ring 1 has no influence on the control lever 10. The aperture is adjusted instead by the exposure meter 33 via the stepped cylinder 31 and the transmission 30, 29, cam 21', guide pin 35, lever 22 and guide bar 23 to the diaphragm 25. Checking of the pointer position by the stepped cylinder 31 is dependent in manner known per se and not shown in detail on actuation of the shutter release, the checking operation taking place only on depression of the release and just before release of the shutter the aperture therefore adjusting exactly to the light conditions immediately prior to exposure.

If the changeover ring 8 is set to the click-stop position for direct flash control as shown in FIGURE 1 the arm 19" is engaged in the recess 20 and the cam zone 9" in the lever 10 is engaged by the transmission pin 5. If the focussing ring 1 is then moved, the control lever 10 is moved via the rocking lever 6 and transmission pin 5, and the movement is transmitted by the control lever 10 to the guide pin 35, rocking lever 22 and guide bar 23 so that the aperture between the diaphragm blades 25 is adjusted in dependence on the distance from the subject to give optimum exposure. Finally, if the changeover ring 8 is adjusted further the arm 19" is still engaged in the recess 20 but the transmission pin 5 engages the cam zone 9'" in the control lever 10 intended for bounced flashlight exposures and will give rise to a different relationship between the distance and aperture setting as compared with the cam zone 9".

As will be apparent from FIGURE 2, the transmission pin 5 advantageously passes through a fixed plate 35' near the focussing ring, such plate 35' having a stepped edge 37, 38, 39 of an opening 36. The steps are so dimensioned that for the two flashlight settings the focussing is limited to values adapted to flashlight illumination. Incorrect exposures are thus reliably obviated in these cases.

I claim:
1. A photographic camera including: adjustable aperture means; a changeover ring; a focussing ring; a control lever for adjusting said aperture means; a first cam in said focussing ring; a second cam in said control lever and having first, second and third zones; and a transmission pin carried by said changeover ring and engaging said cams; said changeover ring being movable to a first position for daylight photography, a second position for direct flashlight photography and a third position for bounced flashlight photography where said transmission pin lies within a respective one of said zones of said second cam, said first zone being so shaped as to accommodate free movement of said transmission pin and thereby allow adjustment of said aperture means independently of said focussing ring, and said second and third zones being so shaped as to transmit movement of said transmission pin to said control lever and thereby adjust said aperture means in dependence on adjustment of the focussing ring.

2. A camera as claimed in claim 1, including: a rocking lever pivoted on said changeover ring; said transmission pin extending parallel to the common axis of said changeover and focussing rings in opposite directions from the free end of said rocking lever to ends engaging said first and second cams respectively.

3. A photographic camera including: adjustable aperture means; a changeover ring; a focussing ring; a control lever for adjusting said aperture means; a first cam in said focussing ring; a second cam in said control lever and having first, second and third zones; a transmission pin carried by said changeover ring and engaging said cams; a built-in exposure meter; and means including a guide pin for adjusting said aperture means in accordance with the indication of said meter; said changeover ring being movable to a first position for dayling photography, a second position for direct flashlight photography and a third position for bounced flashlight photography where said transmission pin lies within a respective one of said zones of said second cam, said first zone being so shaped as to accommodate free movement of said transmission pin and thereby allow adjustment of said aperture means independently of said focussing ring, said second and third zones being so shaped as to transmit movement of said transmission pin to said control lever and thereby adjust said aperture means in dependence on adjustment of said focussing ring; and said guide pin being engaged by said control lever for operation by said control lever when said changeover ring is in one of said second and third positions for flashlight photography.

4. A camera as claimed in claim 3, including: means adapted to be operated by said changeover ring to render said adjusting means inoperative when said changeover ring is in one of said second and third positions for flashlight photography.

5. A photographic camera including: an adjustable aperture means; a changeover ring; a focussing ring; a control lever for adjusting said aperture means; a first cam in said focussing ring; a second cam in said control lever and having first, second and third zones; a rocking lever pivoted on said changeover ring; a transmission pin extending parallel to the common axis of said changeover and focussing rings in opposite directions from the free end of said rocking lever to ends engaging said first and second cams respectively; and a fixed plate having an opening through which said transmission pin extends; said changeover ring being movable to a first position or daylight photography, a second position for direct flashlight photography and a third position for bounced flashlight photography where said transmission pin lies within a respective one of said zones of said second cam, said zone being so shaped as to accommodate free movement of said transmission pin and thereby allow adjustment of said aperture means independently of said focussing ring, said second and third zones being so shaped as to transmit movement of said transmission pin to said control lever and thereby adjust said aperture means in dependence on adjustment of said focussing ring, and said opening in said fixed plate being shaped to limit the movement of said transmission pin and thereby movement of said focussing ring within a range suitable for flashlight photography.

6. A camera as claimed in claim 5, including: a built-in exposure meter; and means including a guide pin for adjusting said aperture means in accordance with the indication of said meter; said guide pin being engaged by said control lever for operation by said control lever when said changeover ring is in one of said second and third positions for flashlight photography.

7. A photographic camera including: adjustable aperture means; a changeover ring; a focussing ring; a control lever for adjusting said aperture means; a first cam in said focussing ring; a second cam in said control lever and having first, second and third zones; a rocking lever on said changeover ring; a transmission pin extending parallel to the common axis of said changeover and focussing rings in opposite directions from the free end of said rocking lever to ends engaging said first and second cams respectively; a built-in exposure meter; means including a guide pin for adjusting said aperture means in accordance with the indication of said meter and means adapted to be operated by said changeover ring to render said adjusting means inoperative when said changeover ring is in one of said second and third positions for flashlight photography;

said changeover ring being movable to a first position for daylight photography, a second position for direct flashlight photography and a third position for bounced flashlight photography where said transmission pin lies within a respective one of said zones of said second cam, said first zone being so shaped as to accommodate free movement of said transmission pin and thereby allow adjustment of said aperture means independently of said focussing ring, said second and third zones being so shaped as to transmit movement of said transmission pin to said control lever and thereby adjust said aperture means in dependence on adjustment of said focussing ring, and said guide pin being engaged by said control lever for operation by said control lever when said changeover ring is in one of said second and third positions for flashlight photography.

8. A camera as claimed in claim 7, including: a fixed plate having an opening through which said transmission pin extends; said opening in said fixed plate being shaped to limit the movement of said transmission pin and thereby movement of said focussing ring within a range suitable for flashlight photography.

References Cited

UNITED STATES PATENTS

| | | | |
|---|---|---|---|
| 2,917,983 | 12/1959 | Gebele et al. | 95—64 |
| 3,087,397 | 4/1963 | Hennig | 95—10 |
| 3,118,356 | 1/1964 | Sauer et al. | 95—10 |
| 3,125,010 | 3/1964 | Winkler et al. | 95—10 |
| 3,129,647 | 4/1964 | Koppen et al. | 95—10 |
| 3,216,340 | 11/1965 | Hennig | 95—10 |

NORTON ANSHER, *Primary Examiner.*

JOSEPH F. PETERS, Jr., *Assistant Examiner.*